United States Patent
Yoon et al.

(10) Patent No.: US 8,672,484 B2
(45) Date of Patent: Mar. 18, 2014

(54) PROJECTION DISPLAY DEVICE FOR PROJECTING LIGHT THAT HAS BEEN COLLIMATED

(75) Inventors: Chan Young Yoon, Gyeonggi-do (KR); Sang Ok Yeo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/264,743

(22) Filed: Nov. 4, 2008

(65) Prior Publication Data

US 2009/0135377 A1    May 28, 2009

(30) Foreign Application Priority Data

Nov. 5, 2007  (KR) .................. 10-2007-0112344

(51) Int. Cl.
*G03B 21/26* (2006.01)

(52) U.S. Cl.
USPC .............................................. 353/30

(58) Field of Classification Search
USPC .............. 353/30, 94, 102; 359/642, 676, 691; 362/555, 561
See application file for complete search history.

(56) References Cited

U.S. PATENT DOCUMENTS

| | | | |
|---|---|---|---|
| 5,382,999 A | 1/1995 | Kamon | |
| 5,662,400 A * | 9/1997 | Shikama et al. | 353/31 |
| 5,796,526 A * | 8/1998 | Anderson | 359/671 |
| 5,823,662 A * | 10/1998 | Conner | 362/328 |
| 6,512,622 B2 * | 1/2003 | Wine et al. | 359/197.1 |
| 7,252,394 B1 * | 8/2007 | Fu | 353/98 |
| 2003/0197956 A1 * | 10/2003 | Yamakawa | 359/738 |
| 2005/0128441 A1 * | 6/2005 | Morgan | 353/102 |
| 2006/0227302 A1 * | 10/2006 | Harbers et al. | 353/94 |
| 2006/0256454 A1 * | 11/2006 | Katsuma et al. | 359/811 |
| 2007/0195534 A1 * | 8/2007 | Ha et al. | 362/327 |
| 2007/0274075 A1 * | 11/2007 | Nagamune | 362/259 |
| 2008/0048553 A1 * | 2/2008 | Destain et al. | 313/499 |
| 2009/0116214 A1 * | 5/2009 | Phillips et al. | 362/84 |

FOREIGN PATENT DOCUMENTS

| | | |
|---|---|---|
| JP | 6-181153 A | 6/1994 |
| JP | 2000-180794 A | 6/2000 |
| JP | 2004-70001 A | 3/2004 |

* cited by examiner

*Primary Examiner* — Thanh Luu
*Assistant Examiner* — Danell L Owens
(74) *Attorney, Agent, or Firm* — Birch, Stewart, Kolasch & Birch, LLP

(57) ABSTRACT

A projection display device is discussed, which can include a condensing lens having a refractive index higher than that of a collimating lens, thereby being capable of miniaturizing not only the collimating lens, but also lenses arranged downstream from the condensing lens.

15 Claims, 7 Drawing Sheets

$n_1 > n_2 \ (n_1 = 1.6, \ n_2 = 1.4)$ $(n_1 = n_2 = 1.2)$ $n_1 > n_2$ ($n_1 = 1.6$, $n_2 = 1.4$)

$n_1 > n_2$ ($n_1 = 2.0$, $n_2 = 1.4$)

PROJECTION DISPLAY DEVICE FOR PROJECTING LIGHT THAT HAS BEEN COLLIMATED

This application claims the priority benefits of Korean Patent Application No. 10-2007-0112344, filed on Nov. 5, 2007 in Republic of Korea, which is hereby incorporated by reference as if fully set forth herein.

BACKGROUND

1. Field

The present invention relates to a projection display device for projecting an image onto an external screen, to display the projected image on the external screen.

2. Background

Large-screen, high-picture-quality display devices have recently received much attention. Various large-screen display devices have been developed and commercially available. A projection display device, namely, a projector, is an example of such a large-screen display device.

Generally, the projector projects an image produced by display elements onto a screen, using light emitted from a light source, and thus displays the image.

Recently, a projector having an ultra-mini size has been developed. Such a projector is referred to as a "pico-projector". This projector can be internally or externally equipped in a portable terminal such as a mobile phone, a notebook computer, or a portable multimedia player (PMP), or in a desktop computer.

SUMMARY OF THE INVENTION

One object of the present invention is to provide a projection display device having a structure that can be effective in reducing the size of the projection display device.

Another object of the present invention is to provide a projection display device which addresses the limitations and disadvantages associated with related art projection display devices.

Another object of the present invention is to provide a projection display device which provides an effective way to generate a collimated light using a minimum number of optical elements.

According to an embodiment, the present invention provides a projection display device comprising: a light source unit configured to emit a light; a first lens including a light incidence surface having a curvature smaller than a curvature of a light outgoing surface of the first lens, the first lens configured to convert the light received from the light source into a condensed light; a plurality of optical elements configured to selectively transmit or reflect a light based on the condensed light from the first lens; and an image projection unit configured to project an image onto an external screen, using the light emerging from the optical elements.

According to an embodiment, the present invention provides a projection display device comprising: a light source unit configured to emit a light; a first lens configured to condense the light emitted from the light source unit; a second lens configured to receive the light from the first lens, and to convert the received light into a collimated light, the second lens having a refractive index lower than a refractive index of the first lens; and an image projection unit configured to project an image onto an external screen, using the collimated light emerging from the second lens.

According to an embodiment, the present invention provides a projection display device comprising: a plurality of light sources configured to emit red, green and blue lights; a plurality of first lenses corresponding to the light sources, each of the first lenses including a light incidence surface having a curvature smaller than a curvature of a light outgoing surface of the first lens, each first lens configured to convert the light received from the corresponding light source into a condensed light; a plurality of second lenses corresponding to the first lenses, each of the second lenses configured to receive the condensed light from the corresponding first lens and to generate a collimated light; a plurality of optical elements configured to selectively transmit or reflect the condensed lights from the second lenses; and an image projection unit configured to project an image onto an external screen, using the light emerging from the optical elements.

The foregoing and other objects, features, aspects and advantages of the present invention will become more apparent from the following detailed description of the preferred embodiments of the present invention when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to the preferred embodiments of the present invention associated with a projection display device, examples of which are illustrated in the accompanying drawings. However, the scope of the present invention is not limited to the following embodiments and drawings. Although a suffix "module" or "unit" is used for constituent elements described in the following description, it is intended only for easy description of the specification. The suffix itself has no meaning or function to distinguish the constituent element using the suffix from the constituent element using no suffix.

It can be appreciated by a skilled person that a projection display device according to embodiments of the present invention may be implemented in the form of a pico-projector, and may be internally or externally equipped in any electronic device. For example, the projection display device can be internally or externally provided in a portable terminal such as a mobile phone, a smart phone, a notebook (laptop) computer, a digital broadcast terminal, a personal digital assistant (PDA), a portable multimedia player (PMP), or a navigation terminal, or in a fixed terminal such as a digital TV or a desktop computer.

Hereinafter, the constituent elements of the projection display device according to the present invention will be described with reference to FIG. 1.

Figure 1:
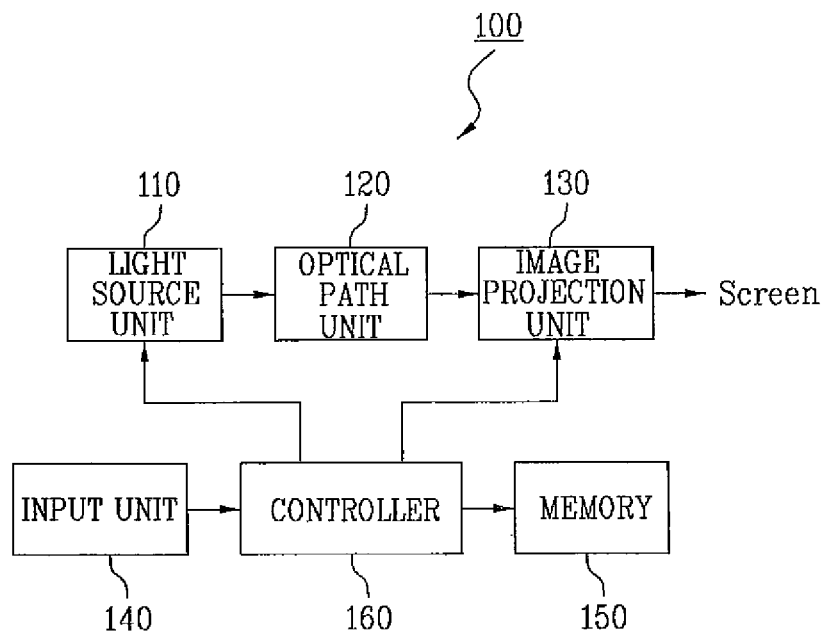
FIG. 1 is a functional block diagram schematically illustrating a projection display device according to an embodiment of the present invention.

FIG. 1 is a functional block diagram schematically illustrating a projection display device according to an embodiment of the present invention.

First, the overall configuration of the projection display device 100 according to an embodiment of the present invention will be described with reference to FIG. 1.

The projection display device 100 according to the present invention includes a light source unit 110, an optical path unit 120, an image projection unit 130, an input unit 140, a memory 150, and a controller 160. All components of the projection display device 100 are operatively coupled and configured.

Of course, the projection display device 100 according to the present invention may further include other elements (e.g., a power supply, a broadcast receiver, etc.), if necessary, in addition to the above-described constituent elements. However, no detailed description will be given of these additional elements, for simplicity of description, because the additional elements have no direct relation with the present invention, and/or the additional elements are known.

Meanwhile, it should be noted that each of the above-described constituent elements may be combined with another constituent element to form one constituent element, or may be divided into two or more constituent elements.

Now, the constituent elements of the projection display device 100 according to the present invention will be described in more detail.

Figure 2:
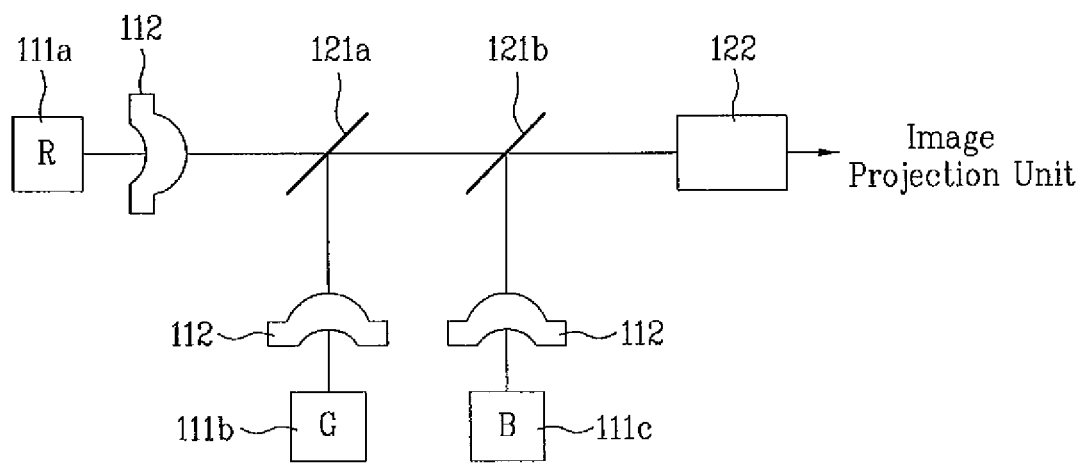
FIG. 2 is a schematic view illustrating configurations of a light source unit and an optical path unit according to a first embodiment of the present invention.
Figure 5:
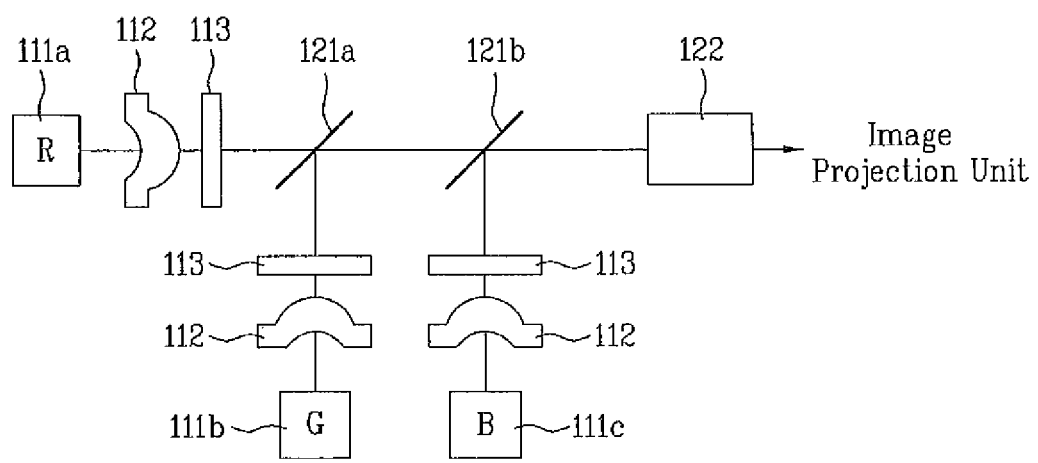
FIG. 5 is a schematic view illustrating the configurations of a light source unit and an optical path unit according to a second embodiment of the present invention.

The light source unit 110 includes first to third light emitting diodes (LEDs) (or other types of light sources) 111a, 111b, and 111c for emitting red (R) light, green (G) light, and blue (B) light, respectively (e.g., as shown in FIGS. 2 and 5). The LEDs 111a, 111b, and 111c generate and emit R light, C light, and B light, respectively, in accordance with the drive current supplied from a power supply under the control of the controller 160. The light source unit 110 may include laser diodes, in place of the LEDs.

The light emitted from the light source unit 110 is condensed by a condensing lens 112 (e.g., as shown in FIGS. 2 and 5). The condensing lens 112 is preferably made of a transparent glass or plastic material. The condensing lens 112 has at least one of a meniscus type spherical shape, an oval shape, and an aspheric shape. The technical features of the condensing lens 112 according to the present invention will be described later.

The collimating lens 113 can convert the light condensed by the condensing lens 112 into a collimated light (e.g., as shown in FIG. 5).

Hereinafter, the configurations of the light source unit 110 and optical path unit 120 will be described in detail with reference to FIG. 2.

FIG. 2 is a schematic view illustrating the configurations of the light source unit 110 and optical path unit 120 of FIG. 1 according to an embodiment of the present invention.

In accordance with the first embodiment of the present invention, as shown in FIG. 2, each of the condensing lenses 112 functions to condense the light emitted from the light source unit 110 (111a, 111b or 111c), and to convert the condensed light into a collimated light.

That is, the condensing lens 112 according to the first embodiment of the present invention performs the same or similar operation as that of a conventional collimating lens 113, namely, a collimating operation, in addition to the condensing operation. Accordingly, in the present invention, it is unnecessary to provide a separate collimating lens when the projection display device 100 is manufactured, and thus the present invention not only miniaturizes or reduces the size of the projection display device 100, but also reduces the manufacturing costs of the projection display device 100.

The condensing lens 112 according to the first embodiment of the present invention will be described later in more detail, with reference to FIGS. 3 and 4. Now, the optical path unit 120 will be described.

The optical path unit 120 includes a synthesizer 121 (121a, 121b) and an integrator 122. Of course, the optical path unit 120 according to the present invention may further include other elements (for example, an illumination lens, etc.), if desired, in addition to the above-described constituent elements. However, no detailed description will be given of these additional elements, for simplicity of description, because the additional elements have no direct relation with the present invention.

The synthesizer 121 performs a selective transmission and reflection for the light condensed by the condensing lens 112. The light output from the synthesizer 121a and 121b is processed by the integrator 122, which sends the resultant light toward the image projection unit 130, in order to produce an image.

The synthesizer 121 may include a plurality of dichroic mirrors, for example, first and second dichroic mirrors 121a and 121b as shown in FIG. 2.

Each of the first and second dichroic mirrors 121a and 121b is a mirror for selectively reflecting and transmitting only the light of particular wavelengths, to obtain the light of a desired wavelength band. Each of the first and second dichroic mirrors 121a and 121b transmits or reflects a selected one of the light beams emitted from the LEDs 111a, 111b, and 111c.

The first dichroic mirror 121a may be arranged at a position where the red (R) light and green (G) light cross each other. As a result, the first dichroic mirror 121a is configured to transmit the R light received from the red LED 111a while reflecting the G light received from the green LED 111b, so that it emits both the R light and G light.

The second dichroic mirror 121b is configured to transmit the R light and G light emerging from the first dichroic mirror 121a while reflecting the blue (E) light received from the blue LED 111c, so that it emits the R light, G light, and B light to the integrator 122.

Thus, the R light, G light, and B light are synthesized/combined while passing through the two dichroic mirrors 121a and 121b so that they produce lights of various colors in accordance with an image to be produced.

Although the above description has been given under the assumption that the first dichroic mirror 121a is arranged at a position where the R right and G light cross each other, the positioning of the dichroic mirrors 121a and 121b according to the present invention is not limited thereto, but can include other locations.

Meanwhile, the integrator 122 shapes the light emerging from the first and second dichroic mirrors 121a and 121b such that the light has a uniform intensity.

The integrator 122 may include at least one of a fly eye lens, a rod lens, a light tunnel or funnel consisting of a box-shaped mirror, and a trapezoidal light funnel.

Figure 3:
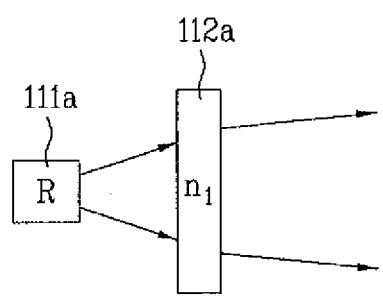
FIG. 3 is a schematic view illustrating a light condensing operation of a condensing lens according to a related art.

FIG. 3 is a schematic view illustrating a light condensing operation of a condensing lens according to a related art.

Figure 4:
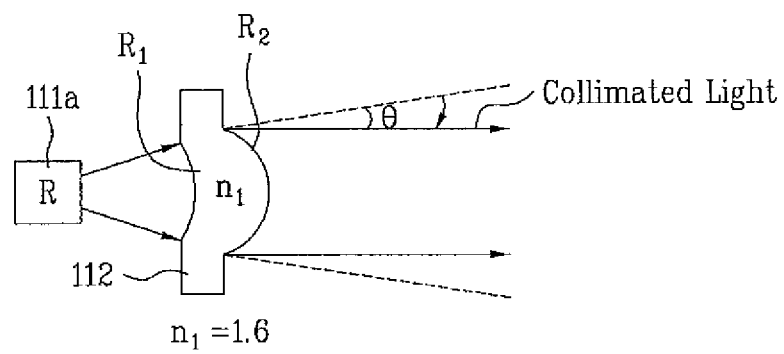
FIG. 4 is a schematic view for explaining a light condensing operation of a condensing lens according to the first embodiment of the present invention.

FIG. 4 is a schematic view for explaining a light condensing operation of a condensing lens according to the first embodiment of the present invention.

Referring to FIG. 4, each condensing lens 112 according to the first embodiment of the present invention has a light incidence surface having a concave shape, and a light outgoing surface having a convex shape.

The condensing lens 112 is fabricated such that the light incidence surface has a curvature smaller than the curvature of the light outgoing surface, to achieve an increase in internal refractive index and a reduction in size. That is, the condensing lens 112 is fabricated such that the absolute value of the radius R1 of the light incidence surface, |R1|, is larger than the absolute value of the radius R2 of the light outgoing surface, |R2|.

The condensing lens 112 according to the present invention, which has the above-described structure, will be compared with a conventional condensing lens 112a shown in FIG. 3.

The conventional condensing lens 112a shown in FIG. 3 has an internal refractive index $n_1$ of, for example, "1.2". In accordance with the refractive index $n_1$, the conventional condensing lens 112a may concentrate a light emitted from the light source unit 110.

In contrast, the condensing lens 112 according to the first embodiment of the present invention shown in FIG. 4 concentrates the light emitted from the light source unit 110 such that the light is converted into a collimated light, and then emits the resultant light to the synthesizer 121.

That is, the condensing lens 112 according to the present invention has an internal refractive index $n_1$ capable of converting the incident light into a collimated light during the concentration of the light. Referring to FIG. 4, the internal refractive index $n_1$ of the condensing lens 112 is, for example, 1.6.

As apparent from the above description, the conventional condensing lens 112a performs only an operation of condensing the light. In other words, the conventional condensing lens 112a does not convert the light into a collimated light during the concentration operation. In contrast, the condensing lens 112 according to the present invention condenses the light and generates a collimated light. For this reason, a separate collimating lens is not needed in the present invention because the condensing lens 112 according to the present invention concentrates light such that the light is converted into a collimated light. Accordingly, it is possible to achieve a miniaturization and a reduction in manufacturing costs of the projection display device.

FIG. 5 illustrates a structure modified from the structure of FIG. 2, in which a collimating lens 113 is arranged between the condensing lens 112 and the optical path unit 120 according to a second embodiment of the present invention.

Figure 6:
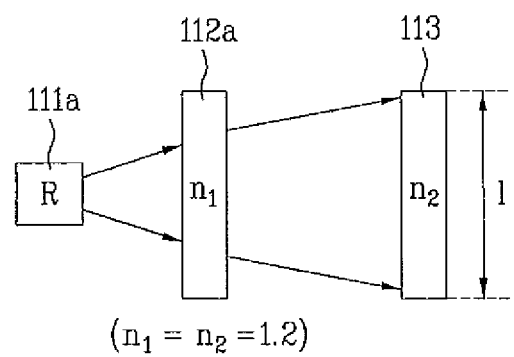
FIG. 6 is a schematic view illustrating a concentration operation of the condensing lens and a collimation operation of the collimating lens according to a related art.

FIG. 6 is a schematic view illustrating a concentration operation of a conventional condensing lens and a collimation operation of the conventional collimating lens according to a related art.

Figure 7:
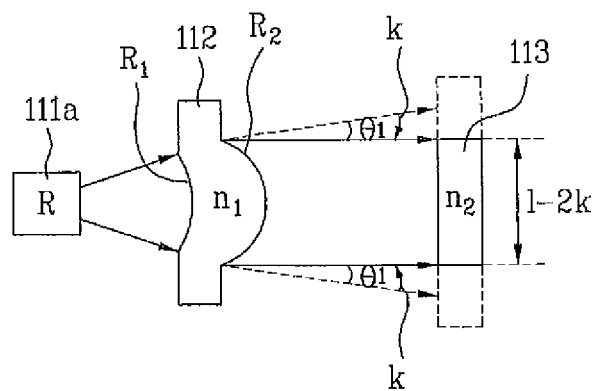
FIG. 7 is a schematic view illustrating one size of the collimating lens compared to the refractive index of the condensing lens in accordance with the second embodiment of the present invention.

FIG. 7 is a schematic view illustrating one size of a collimating lens compared to the refractive index of a condensing lens in accordance with the second embodiment of the present invention.

Figure 8:
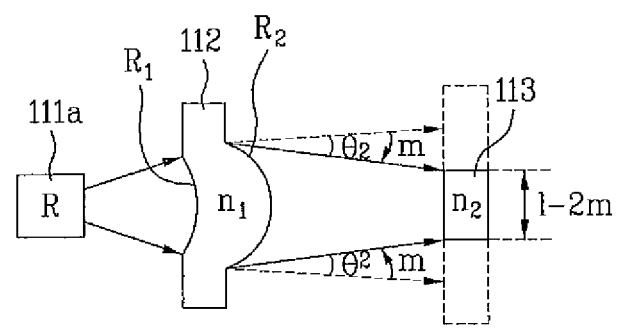
FIG. 8 is a schematic view illustrating another size of the collimating lens compared to the refractive index of the condensing lens in accordance with the second embodiment of the present invention.

FIG. 8 is a schematic view illustrating another size of the collimating lens compared to the refractive index of the condensing lens in accordance with the second embodiment of the present invention.

Referring to FIG. 5, a collimating lens 113 is arranged between the condensing lens 112 (in front of the LED 111a) and the first dichroic mirror 121a, a collimating lens 113 is arranged between the condensing lens 112 (in front of the LED 111b) and the first dichroic mirror 121a, and a collimating lens 113 is arranged between the condensing lens 112 (in front of the LED 111c) and the second dichroic mirror 121b, in accordance with the second embodiment of the present invention.

Each condensing lens 112 according to the second embodiment of the present invention is fabricated such that it has a refractive index higher than that of the corresponding collimating lens 113.

FIG. 6 shows a conventional condensing lens 112a and the collimating lens 113 according to a related art. The refractive index $n_1$ of the condensing lens 112a and the refractive index $n_2$ of the collimating lens 113 are the same as the refractive index of air, namely, "1.2". Where the refractive index $n_1$ of the condensing lens 112a is 1.2, the condensing lens 112a according to the related art may condense the light received from the light source unit 110 by an angle of θ, and then sends the resultant light to the collimating lens 113. The collimating lens 113 has a size of "1" to completely receive the overall portion of the light concentrated by the angle of θ through the condensing lens 112a. That is, the size of the collimating lens 113 is determined in accordance with the condensation angle of the condensing lens 112a.

To this end, in accordance with the second embodiment of the present invention, the refractive index $n_1$ of the condensing lens 112 and the refractive index $n_2$ of the collimating lens 113 are set to be equal to or higher than "1.3". Also, the refractive index $n_1$ of the condensing lens 112 is set to be higher than the refractive index $n_2$ of the collimating lens 113.

As the refractive index $n_1$ of the condensing lens 112 increases, it is possible to increase the condensation power of the condensing lens 112, and thus to reduce the size of the collimating lens 113.

FIG. 7 shows one example of the condensing lens 112 and collimating lens 113 according to the second embodiment of the present invention. In this case, the refractive index $n_1$ of the condensing lens 112 is set to be "11.6", and the refractive index $n_2$ of the collimating lens 113 is set to be "1.4" where $n_1 > n_2$ and both $n_1$ and $n_2$ are higher than 1.3.

Of course, the refractive index $n_1$ of the condensing lens 112 and the refractive index $n_2$ of the collimating lens 113 are not limited to the above-described values. The refractive index $n_1$ of the condensing lens 112 and the refractive index $n_2$ of the collimating lens 113 may have other values, as long as the refractive index $n_1$ of the condensing lens 112 is equal to or higher than the refractive index $n_2$ of the collimating lens 113.

Where the refractive index $n_1$ of the condensing lens 112 is "1.6", and the refractive index $n_2$ of the collimating lens 113 is "1.4", the condensing lens 112 condenses the light received from the light source unit 110 by an angle of $\theta_1$, and then sends the resultant collimated light to the collimating lens 113.

Since the condensing lens 112 condenses the light by the angle of $\theta_1$, the collimating lens 113 can be fabricated such that the collimating lens 113 has a size of "1-2 k" which is smaller than the size of "1" used in the related art of FIG. 6. As a result, the present invention allows the use of a smaller sized collimating lens with a uniquely designed condensing lens, to obtain desired effects.

Also, it is possible to reduce the size of the condensing lens 112 while increasing the internal refractive index of the condensing lens 112 by fabricating the condensing lens 112 such that the absolute value of the light incidence surface radius R1 of the condensing lens 112, |R1|, is larger than the absolute value of the light outgoing surface radius R2 of the condensing lens 112, |R2|.

FIG. 8 shows another example in which the condensing lens 112 and collimating lens 113 have certain characteristics in accordance with the present invention. In this case, the refractive index $n_1$ of the condensing lens 112 according to the present invention is "2.0", and the refractive index $n_2$ of the collimating lens 113 is "1.4".

That is, where the refractive index $n_1$ of the condensing lens 112 is "2.0", and the refractive index $n_2$ of the collimating lens 113 is "1.4", the condensing lens 112 condenses the light received from the light source unit 110 by an angle of $\theta_2$, and then sends the resultant light to the collimating lens 113.

Since the condensing lens 112 condenses the light by the angle of $\theta_2$, the collimating lens 113 can be fabricated such that it has a size of "1-2 m" which is smaller than that of FIG. 7, namely, the size of "1-2 k". Thus, in the present invention, the length of the collimating lens 113 proportionally corresponds to the refractive index of the condensing lens 112. For instance, depending on the refractive index of the condensing lens 112, the length of the collimating lens 113 varies proportionally.

Accordingly, in the present invention, it is possible to vary or reduce the size of the collimating lens 113 in accordance with the refractive index of the condensing lens 112, and thus to vary or reduce the sizes of lenses arranged downstream from the collimating lens 113. As a result, the present invention makes it possible to miniaturize the projection display device 100 effectively, and thus to reduce the manufacturing costs of the projection display device 100.

Returning to FIG. 1, the image projection unit 130 produces an image, using the light emerging from the optical path unit 120, under the control of the controller 160, and then projects the produced image onto an external screen, to display the image.

The image projection unit 130 may be generally classified into a display panel type or a scanner type, but can be of a different type.

Hereinafter, the configuration of the image projection unit 130, which is of a display panel type, will be described with reference to FIG. 9.

Figure 9:
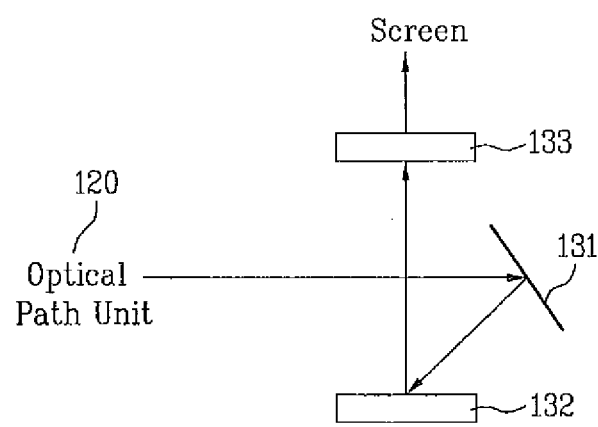
FIG. 9 is a schematic view illustrating a configuration of a display panel type image projection unit according to the present invention.

Referring to FIG. 9, the display panel type image projection unit 130 according to an embodiment of the present invention includes a reflection plate 131, a display panel 132, and a projection lens 133.

The display panel 132 receives the light emerging from the optical path unit 120 via the reflection plate 131, and projects an image onto the screen through the projection lens 133, using the received light.

The display panel 132 may comprise a reflection type imaging unit such as a digital micro mirror device or a reflection type liquid crystal display device. The reflection type imaging unit selectively reflects the incident light by pixels, to form an image.

Meanwhile, the projection lens 133 projects the image produced by the display panel 132 onto the screen in an enlarged state.

Now, the configuration of the image projection unit 130, which is of a scanner type, will be described with reference to FIG. 10.

Figure 10:
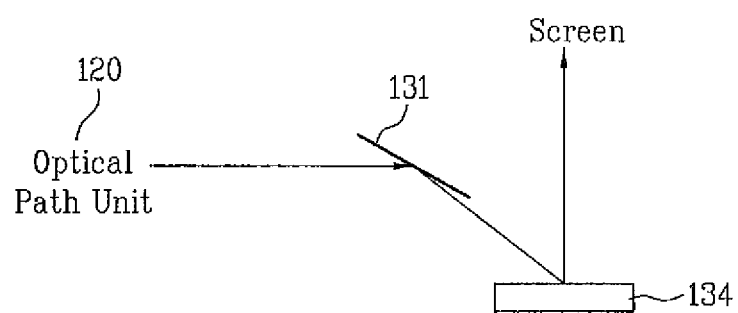
FIG. 10 is a schematic view illustrating a configuration of a scanner type image projection unit according to the present invention.

Referring to FIG. 10, the scanner type image projection unit 130 according to an embodiment of the present invention includes a reflection plate 131 and a scanner 134.

The scanner 134 reflects the light received via the reflection plate 131 in a horizontal or vertical direction or in the horizontal and vertical directions, to raster-scan the reflected light onto the screen.

The scanner 134 includes at least one micro scanner having a rotatable mirror. As an example of the micro scanner, a biaxially-driven micro scanner is shown in FIGS. 11 and 12.

Hereinafter, an example of the micro scanner to be used in the image projection unit 130 will be described in detail with reference to FIGS. 11 and 12.

Figure 11:
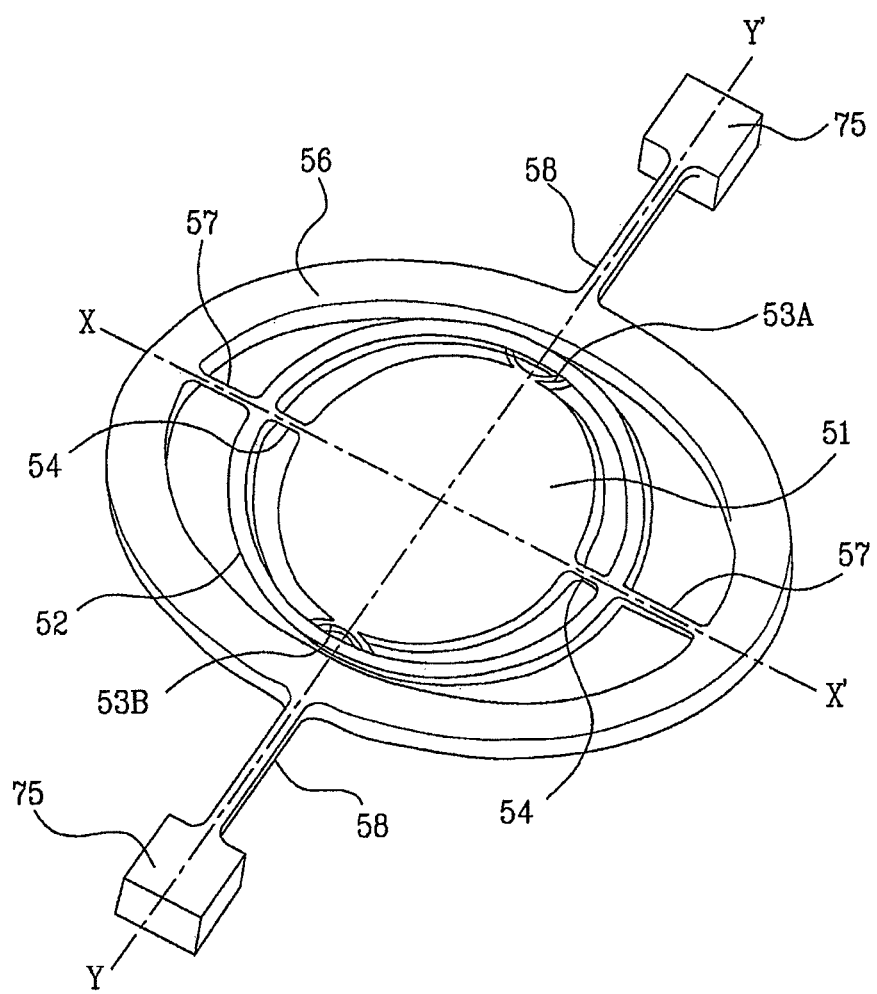
FIG. 11 is a perspective view illustrating a micro scanner according to the present invention.

FIG. 11 is a perspective view illustrating the micro scanner according to the present invention. FIG. 12 is a plan view for explaining connectors provided at the micro scanner of FIG. 11.

Figure 12:
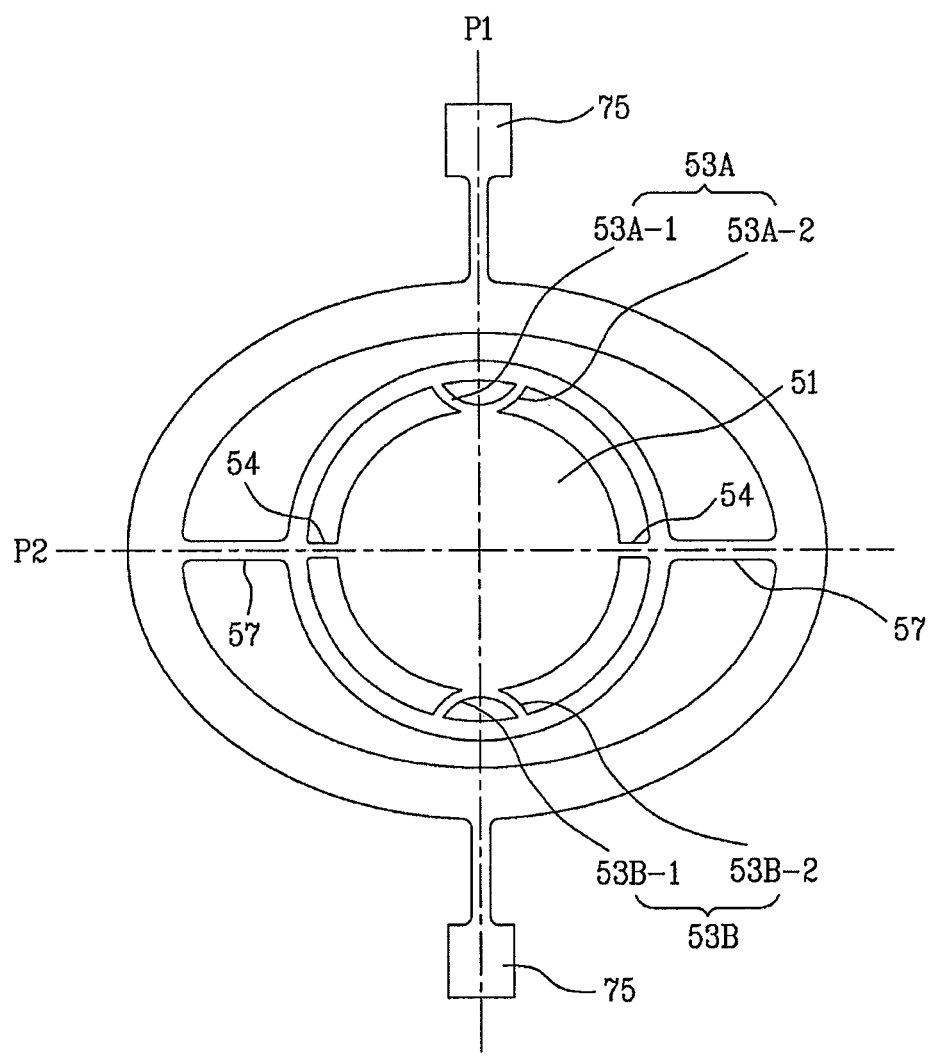
FIG. 12 is a plan view for explaining connectors provided at the micro scanner of FIG. 11.

As shown in FIGS. 11 and 12, the micro scanner includes a mirror plate 51 including a thin film formed with a reflection surface for reflecting a laser light, and a frame arranged beneath the thin film to support the thin film, an outer frame 52 arranged to be outwardly spaced apart from the periphery of the mirror plate 51, a plurality of connectors 53A, 53B, and 54 for connecting the mirror plate 51 and the outer frame 52, and a gimbal 56 arranged to be outwardly spaced apart from the periphery of the outer frame 52. The micro scanner also includes a pair of inner elastic flexible members 57 symmetrically formed with respect to the mirror plate 51, and connected to the gimbal 56 and to the outer frame 52, and a pair of outer elastic flexible structures 58 symmetrically formed with respect to the mirror plate 51, and connected to the gimbal 56 and to a pair of support members 75, to upwardly raise the mirror plate 51, outer frame 52, and gimbal 56.

As shown in FIG. 12, the plural connectors 53A, 53B, and 54 functioning to connect the mirror plate 51 and the outer frame 52 include first connectors, namely, the connectors 54, and second connectors, namely, the connectors 53A and 53B. The second connectors 53A and 53B are formed on a first line P1 connecting the outer elastic flexible members 58 such that they are symmetrical with respect to the mirror plate 51. The first connectors 54 are formed on a second line P2 perpendicular to the first line P1 such that they are symmetrical with respect to the mirror plate 51. The second connector 53A includes two symmetrical portions 53A-1 and 53A-2, whereas the second connector 53B includes two symmetrical portions 53B-1 and 53B-2.

The gimbal 56 is connected to the outer frame 52 by the inner elastic flexible members 57. The gimbal 56 is also connected to the support members 75 by the outer elastic flexible members 58 symmetrically formed on a line perpendicular to the inner elastic flexible members 57.

The outer elastic flexible members 58 connect the gimbal 56 to the support members 75 such that the mirror plate 51, outer frame 52, and gimbal 56 are upwardly raised. In the drawings, only a portion of each support member 75 is schematically shown.

The inner and outer elastic flexible members 57 and 58 provide a recovering torque during operation of the micro mirror while functioning as rotating axes.

That is, the outer frame 52 rotates about the inner elastic flexible members 57 as an axis (this axis extends a line X-X', as shown in FIG. 11, and will be referred to as an "X-axis"). The gimbal 56 rotates about the outer elastic flexible members 58 as an axis (this axis extends a line Y-Y', as shown in FIG. 11, and will be referred to as a "Y-axis").

The micro scanner 134 having the above-described structure can perform rotating operations with 2 axial degrees of freedom. That is, the micro scanner 134 can rotate not only about the inner elastic flexible members 57, namely, the X-axis, but also about the outer elastic flexible members 58, namely, the Y-axis. The axial rotations of the micro scanner 134 do not have influence on each other, so that they can be independently controlled. Accordingly, it is possible to implement a micro mirror capable of being inclined from a 2-dimensional plane by an arbitrary angle.

When the above-described micro scanner 134 is used, the scanning operation is carried out in accordance with a micro rotation of the mirror plate 51. Accordingly, sweeping can be carried out at a very high speed.

Meanwhile returning to FIG. 1, the input unit 140 includes a key pad, a dome switch, a touch pad (constant voltage/constant current), a jog wheel, a jog switch, buttons, keys, etc. The input unit 140 generates input data, which will be used to control the operation of the projection display device 100 according to the present invention.

Where the projection display device 100 according to the present invention is internally or externally equipped in a portable terminal such as a mobile phone, a smart phone, a notebook (laptop) computer, a digital broadcast terminal, a PDA, a PMP, or a navigation terminal, or in a fixed terminal such as a digital TV or a desktop computer, the input unit 140 may be an operating unit equipped in the portable terminal or fixed terminal.

The memory 150 may store therein a program for controlling the projection display device 100 according to the present invention, or may perform a function for temporarily storing input/output data.

The memory 150 may include at least one storage medium selected from a flash memory type memory, a hard disk type memory, multimedia card micro type memory, a card type memory (for example, an SD or XD memory), a random access memory (RAM), a static random access memory (SRAM), a read-only memory (ROM), an electrically-erasable programmable read-only memory (EEPROM), a programmable read-only memory (PROM), a magnetic memory, a magnetic disc, and an optical disc.

The controller 160 controls the overall operation of the projection display device 100 according to the present invention. When a key signal for driving the projection display device 100 is input through the input unit 140, the controller 160 controls the light source unit 110 and image projection unit 120, to project an image onto the screen.

Where the projection display device 100 according to the present invention is internally or externally equipped in a portable terminal such as a mobile phone, a smart phone, a notebook (laptop) computer, a digital broadcast terminal, a PDA, a PMP, or a navigation terminal, or in a fixed terminal such as a digital TV or a desktop computer, the controller 160 may be a controller equipped in the portable terminal or fixed terminal.

Although the embodiments of the present invention have been described in conjunction with particular matters such as concrete constituent elements, the illustrative embodiments and the accompanying drawings, they are intended only to facilitate understanding of the invention. Accordingly, the present invention is not limited to such matters, embodiments and drawings. It will be apparent to those skilled in the art that various modifications and variations can be made in the present invention without departing from the spirit or scope of the inventions.

Thus, it is intended that the present invention is not limited to the above-described embodiments, and covers the modifications and variations of this invention provided they come within the scope of the appended claims and their equivalents.

What is claimed is:

1. A projection display device, comprising:
   a light source unit configured to emit a light;
   a first lens including a light incidence surface having a curvature smaller than a curvature of a light outgoing surface of the first lens, the first lens configured to convert the light received from the light source into a condensed light;
   a second lens configured to receive the light from the first lens, and to convert the received light into a collimated light, the second lens having a refractive index lower than a refractive index of the first lens;
   an optical element configured to selectively transmit or reflect the collimated light from the second lens; and
   an image projection unit configured to project an image onto an external screen,
   wherein the first lens converts the light received from the light source into a condensed light having rays that are substantially parallel or substantially converged such that a size of the image through the second lens is equal to or smaller than a size of an image through the first lens.

2. The projection display device according to claim 1, wherein a length of the second lens proportionally corresponds to the refractive index of the first lens.

3. The projection display device according to claim 1, wherein the first lens has at least one of a meniscus type spherical shape, an oval shape, or an aspheric shape.

4. The projection display device according to claim 1, wherein the light source unit comprises a light emitting diode or a laser.

5. The projection display device according to claim 1, wherein the refractive indexes of the first and second lenses are equal to or higher than approximately 1.3.

6. The projection display device according to claim 1, wherein the optical element comprises a plurality of dichroic mirrors.

7. The projection display device according to claim 1, wherein the image projection unit reflects the light emerging from the optical element in at least one of horizontal and vertical directions.

8. The projection display device according to claim 1, wherein the light incident surface and the light outgoing surface are curved in the same direction.

9. The projection display device according to claim 1, wherein the absolute value of the light incidence surface radius of the first lens is greater than the absolute value of the light outgoing surface radius.

10. The projection display device according to claim 1, wherein the difference of the refractive index of the first lens and the second lens is 0.2 or 0.6.

11. The projection display device according to claim 1, wherein a size of an image through the second lens is smaller than a size of an image through the first lens.

12. The projection display device according to claim 1, wherein the image projection unit comprises a scanner configured to raster-scan the collimated light from the second lens onto the external screen.

13. The projection display device according to claim 12, wherein the scanner comprises a biaxially-driven micro scanner.

14. The projection display device according to claim 12, wherein the scanner comprises:
- a mirror plate including a thin film formed with a reflection surface for reflecting a light;
- a frame arranged beneath the thin film to support the thin film;
- an outer frame arranged to be outwardly spaced apart from the periphery of the mirror plate; and
- a plurality of connectors for connecting the mirror plate and the outer frame.

15. The projection display device according to claim 14, wherein the scanner further comprises a gimbal arranged to be outwardly spaced apart from the periphery of the outer frame.

* * * * *